United States Patent [19]

Yamaguchi et al.

[11] Patent Number: 5,027,296
[45] Date of Patent: Jun. 25, 1991

[54] LENGTH MEASURING APPARATUS

[75] Inventors: Shuji Yamaguchi, Tachikawa; Atsuko Shimizu, Akishima, both of Japan

[73] Assignee: Casio Computer Co., Ltd., Tokyo, Japan

[21] Appl. No.: 373,157

[22] Filed: Jun. 28, 1989

[30] Foreign Application Priority Data

Jul. 4, 1988 [JP] Japan ............................. 63-88878[U]
Jul. 6, 1988 [JP] Japan ............................. 63-89729[U]

[51] Int. Cl.⁵ .......................... G01B 11/02; G06F 7/00
[52] U.S. Cl. ..................................... 364/562; 33/773
[58] Field of Search ............... 364/561, 562, 565, 446, 364/443, 444; 33/772, 773, 775, 780

[56] References Cited

U.S. PATENT DOCUMENTS

| | | | |
|---|---|---|---|
| 3,918,163 | 11/1975 | Keating | 33/773 |
| 3,999,298 | 12/1976 | Nishimura | 33/775 |
| 4,176,397 | 11/1979 | Crom et al. | 364/561 |
| 4,181,959 | 1/1980 | Tateishi | 364/562 |
| 4,216,530 | 8/1980 | Yamaki et al. | 364/446 |
| 4,263,657 | 4/1981 | Oka et al. | 364/444 |
| 4,383,301 | 5/1983 | Morita et al. | 364/562 |
| 4,675,676 | 6/1987 | Takanabe et al. | 340/995 |
| 4,914,831 | 4/1990 | Kanezashi et al. | 33/780 |

FOREIGN PATENT DOCUMENTS

| | | |
|---|---|---|
| 61-149801 | 7/1986 | Japan . |
| 61-169710 | 7/1986 | Japan . |
| WO85/05175-A1 | 11/1985 | PCT Int'l Appl. . |
| WO89/03502-A2 | 4/1989 | PCT Int'l Appl. . |
| 1295307 | 4/1970 | United Kingdom . |
| 2074312A | 10/1981 | United Kingdom . |
| 2150301 | 6/1985 | United Kingdom . |

Primary Examiner—Kevin J. Teska
Assistant Examiner—Michael Zanelli
Attorney, Agent, or Firm—Frishauf, Holtz, Goodman & Woodward

[57] ABSTRACT

A length-measuring apparatus is provided with memory for storing scale reduction data of a map and for storing unit data of length. Actual distance is calculated by calculation circuit when a rotating member is moved to roll along a point-to-point course on the map. Distance data expressed in unit corresponding to the above unit data of length is obtained. A plurality of distance data obtained by the above calculation circuit can be stored in memory together with the unit data of length and also can be displayed on display by operation of the display switch.

5 Claims, 10 Drawing Sheets

LENGTH MEASURING APPARATUS

BACKGROUND OF THE INVENTION

1. Field of the Invention

The present invention relates to a length measuring or map meter apparatus for measuring the length of an object or length between two points, or a distance measure for measuring the distance between two points on a map.

2. Description of the Related Art

An apparatus is known which rotates a rotational disc along a line connecting two points and detects the amount of rotation of the disc to thereby measure the distance or length between the two points. Such a measuring apparatus is disclosed in, for example, Japanese Patent Disclsoure Nos. 61-169710 and 61-149801.

U.S Pat. No. 3,999,198 discloses such a measuring apparatus assembled in a wrist watch.

A technique concerning a measuring apparatus assembled in a wrist watch has been also described in U.S. patent application Ser. No. 315,526 filed on Feb. 24, 1989 U.S. Pat. No. 4,914,831 (Assignee: Casio Computer Co., Ltd. of the present invention). This type of a length measuring apparatus is used as, for example, a map meter. This map meter is used for measuring point to point distances on a map and indicating real distances upon correction by multiplying the above point to point distances by the scale reduction data to the map, which have been input to the map meter.

In this type of map meter, in order to obtain a plurality of distance data between a series of points, it is necessary to clear a distance data previously obtained every time other distance data is to be measured, and therefore it is also necessary to make notes of distance data between points. Further, in conventional map meters, scale reduction data must be set by means of the input keys in accordance with the scale reduction to the map to be used, every time measurement is executed. Accordingly, disregarding that in general, scale reductions to maps are limited to several scales, these map meters must be reset every measurement by inputting scale reduction data, which requires troublesome operations.

SUMMARY OF THE INVENTION

The present invention has been made to overcome the above mentioned disadvantages. An object of the present invention is to provide a length measuring apparatus which is not only capable of easily displaying a plurality of measured length data but also has overcome the inconvenience that the scale reduction data is to be set every time measurement is executed.

To achieve the object, there is provided a length measuring apparatus comprising:

length-signal output means for outputting a signal corresponding to a length of a course to be measured;

scale-reduction data memory means for storing scale-reduction data;

unit-data memory means for storing unit data of length;

calculation means for obtaining distance data expressed in the unit data as unit of length, said unit data being stored in said unit-data memory means, from the signal output by said length-signal output means and the scale-reduction data stored in said scale-reduction data memory means;

measured distance data memory means for storing a plurality of measured distance data comprising the distance data obtained by said calculation means and said unit data; and display means for displaying the measured distance data stored in said measured distance data memory means.

As constructed as mentioned above, the length measuring apparatus requires no such a troublesome switching operation to clear a measured data after measuring of a distance between two points, in order to measure another point to point distance but also is capable of indicating a plurality of arbitrary measured data stored therein. Further, the length measuring apparatus has merit in that it requires no re-setting operation to be executed every measurement, resulting in a simple switching operation.

DETAILED DESCRIPTION OF THE PREFERRED EMBODIMENT

An embodiment of the present invention will be precisely described hereinafter referring to the accompanying drawings. Note that in the present embodiment, a map meter as a length-measuring apparatus is applied to an electronic wrist watch having various functions.

Construction

Figure 1:
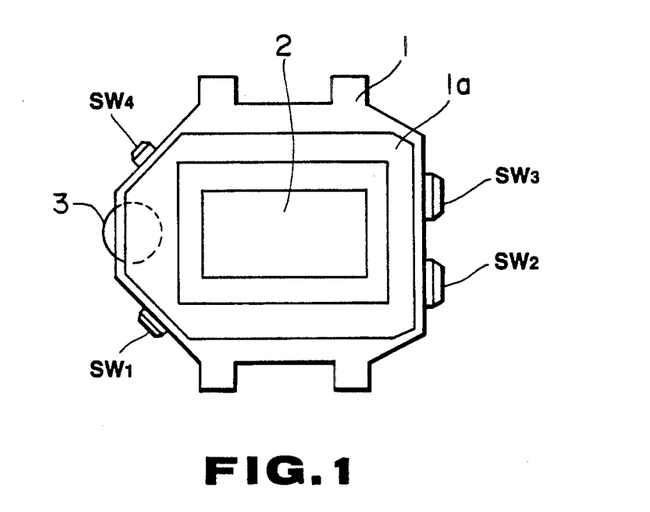
FIG. 1 is an external view showing a wrist watch equipped with a length measuring apparatus of the present invention.

FIG. 1 is an external view showing the present embodiment. On the front face 1a of the wrist watch casing 1 is arranged the liquid crystal display panel 2 on which time data, distance data and the like are displayed. A measuring wheel is mounted rotatably in a supposed plane parallel to the above front face 1a of the watch casing 1 and a part thereof is exposed outside from the left side wall of the watch casing 1. The other side walls of the watch casing 1 are provided with button switches $SW_1$, $SW_2$, $SW_3$ and $SW_4$ adopted to be used for various processings as will be described later.

Figure 2:
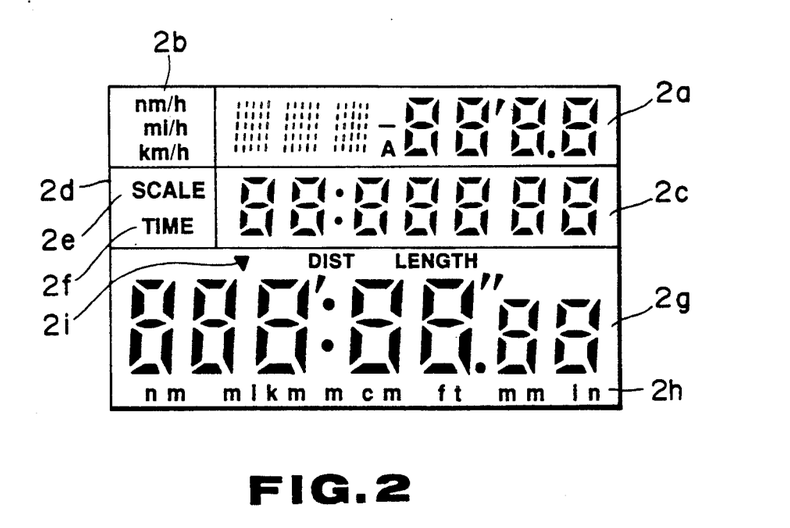
FIG. 2 is a view showing an arrangement of display elements of a liquid crystal display panel of the wrist watch shown in FIG. 1.

FIG. 2 is a view showing an arrangement of display elements (display electrodes) of the above liquid crystal display panel 2. More specifically, a first display section 2a is provided with dot display elements for three digits and seven-segment display elements for four digits, and a second display section 2b is provided with display elements indicating various units of speed. On a third display section 2c are arranged seven-segment display elements for seven digits for indicating the scale reduction data and date data. On a fourth display section 2d are arranged a scale display element 2e consisting of characters "SCALE", to be displayed when the scale reduction data are displayed on the above third display section 2c and a time display element 2f consisting of characters "TIME", to be displayed when the time data are displayed. A fifth display section 2g is provided with seven-segment display elements of seven digits for displaying the time data and measured distance data. On a sixth display section 2h are arranged display elements for indicating various units of length, for example, display elements consisting of characters "in" indicating "inch", display elements consisting of characters "mm" indicating "millimeter", display elements consisting of characters "ft" indicating "feet" and the like. Further, display elements "LENGTH" are disposed, which are turned on when a length data actually measured from an object to be measured is displayed by the seven-segment display elements of the fifth display elements 2g. Furthermore, display elements "DIST" are disposed which are turned on when a distance data measured on a map is displayed by the fifth display elements 2g. A measurement-state mark display element 2i is also disposed which is displayed in a blinking fashion, in a state wherein a length can be measured by use of the measuring wheel 3.

Figure 3:
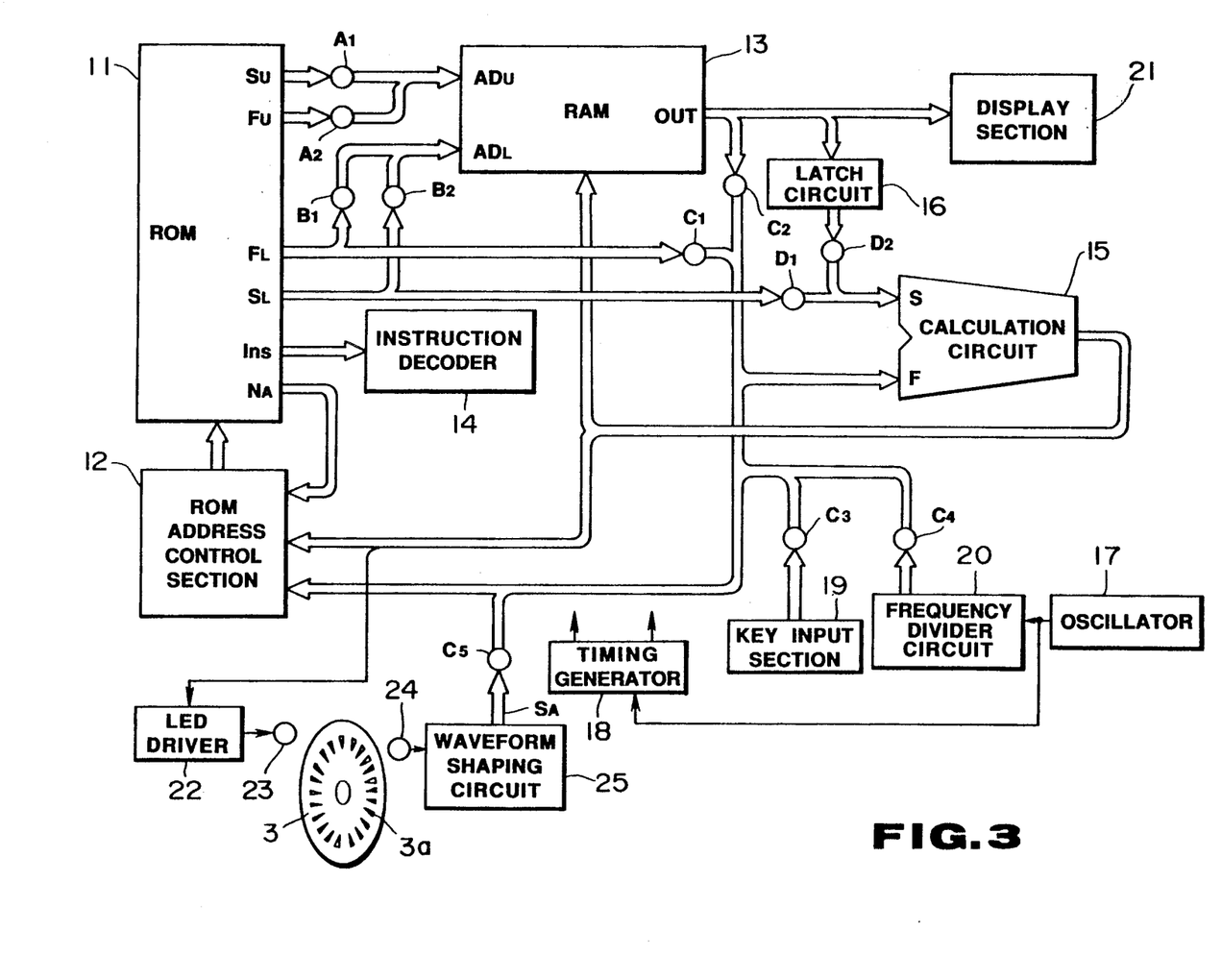
FIG. 3 is a view showing a circuit construction of the above wrist watch.

FIG. 3 is a view showing a circuit construction of the present embodiment. In FIG. 3, ROM 11 is a fixed memory including various data and a micro program for controlling the whole system. ROM address control section 12 is an address section of the above ROM 11, to which next address data output NA for controlling a flow of the program from ROM 11, output data of a calculation circuit 15, output data of a frequency divider circuit 20 to be described later and the like have been input. RAM 13 outputs data of addresses designated by address-data outputs of ROM 11 SU, SL and FU, FL and serves as a memory for storing data which are obtained when the calculation circuit 15 has processed various data. An instruction decoder circuit 14 is a circuit block for decoding instruction signals output from ROM 11 to deliver control signals to various circuit blocks. The calculation circuit 15 executes arithmetic logical operation when it receives inputs S and F, and writes the results of the operation at addresses of RAM 13 designated by outputs FU and FL of ROM 11. A latch circuit 16 stores temporarily data output from RAM 13 and delivers the same to input S of the calculation circuit 15 in synchronism with input F of the calculation circuit 15.

An oscillator 17 outputs a clock signal of a constant period and a timing-generator circuit 18 divides the above clock signal to a certain frequency to output a timing signal for controlling various circuit blocks in a time-series fashion. A key input section 19 includes the above mentioned switches SW1 through SW4 and serves to deliver signals to a system for instructing various processing operations. The frequency divider circuit 20 is a counter for dividing the output signal of the oscillator 17 and outputs a time-count signal having a constant period. Time-count data of RAM 13 (to be described later) are renewed every time the above clock signal is input thereto.

A display section 21 is a circuit block for displaying processed data, i.e., times, distances and the like. The above mentioned liquid crystal display panel 2 is included to the above circuit block. A LED driver circuit 22 operates in response to signals from the calculation circuit 15 to turn on LED 23. Light emitted from LED 23 is applied to a photo sensor 24 through a number of slits 3a formed in the portion close to the circumference of the measuring wheel 3. While the measuring wheel 3 is turning, the light input to the photo sensor 24 is periodically interrupted in response to the rotating speed of the measuring wheel 3. Therefore, the photo sensor 3 outputs a discontinuous waveform signal. A waveform shaping circuit 25 serves to shape the above discontinuous waveform signal and delivers the same as a signal SA (to be described later). Bus-control gate circuits $A_1$, $A_2$, $B_1$, $B_2$, $C_1$ through $C_5$, $D_1$ and $D_2$ serve to control an open/close operation of various buses on the basis of outputs of the instruction decoder 14.

Figure 4:
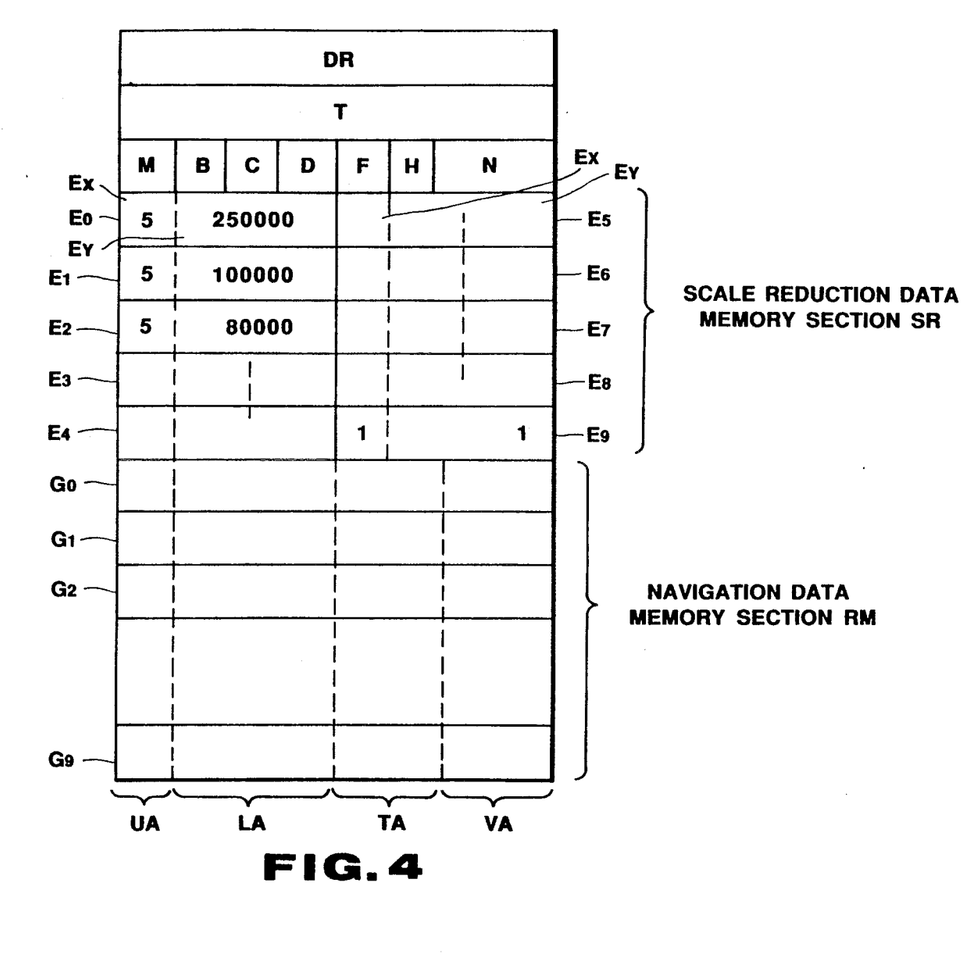
FIG. 4 is a view showing a construction of RAM shown in FIG. 3.

FIG. 4 is a view showing the construction of the above mentioned RAM 13. A display register DR is a register to which data to be displayed on the liquid crystal display panel 2 are set. A time-count register T is a register at which present times are set. A mode register M is a divided-by-4 counter and designates a time-display mode when the counter takes a value "0", designates a measure mode when the counter takes a value "1", designates a map-meter mode when the counter take a value "2", and designates a navigation mode when the counter takes a value "3". In the time-display mode, the present time is displayed on the liquid crystal display panel 2. In the measure mode, a length of an object is measured by moving the measuring wheel 3 to roll along a path on the above object. In the map-meter mode, a length of a particular path on a map is measured by use of the above measuring wheel 3 and then distance data is calculated on the basis of the measured length. In the navigation mode, a speed or time is calculated from the distance calculated in the map-meter mode, input speed and input time. A memory pointer B serves to designate an address of one memory in the scale-reduction data memory section SR comprising a plurality of memories $E_0$ through $E_9$. A state register C serves to designate various states, such as the normal state or scal-reduction data inputable state in the above map meter mode. A memory pointer D serves to designate one memory in the navigation data memory section RM comprising a plurality of memories $G_0$ through $G_9$. A state register F serves to designate various states in the navigation mode. A register H is a register for storing actual lengths measured by use of the measuring wheel 3. A measurement register N is a register in which actual distances are sequentially stored which are calculated based on the lengths on maps and the relevant scale-reduction data. The scale-reduction memory section SR comprises memories $E_0$ through $E_9$ and each memory comprises a scale-reduction area EY and a unit area EX. In the scale-reduction area EY, scale-reduction data are stored. In the unit area EX are stored unit data corresponding to units, each used for measuring a length with use of the scale reduction, such as, for example, "0" for "inch" (in), "1" for millimeter (mm), "5" for kilometer (km), "7" for nano meter (nm) and so on. Note that in the present embodiment, ten kinds of typical unit data and scale-reduction data are transferred from ROM 11 to the above memories $E_0$ through $E_9$ and are stored therein at the time when the power supply is turned on. The navigation-data memory section RM comprises memories $G_0$ through $G_9$ and each memory comprises a distance-data memory area LA, a unit memory area UA, a time memory area TA and a speed memory area VA. Actual distance data calculated from measured lengths on a map and the scale reduction to the map are stored in the above distance-data memory area LA. Unit data of units used in the above calculation are stored in the unit memory area UA. Required time data which are input or calculated are stored in the above time memory area TA. Speed data which are input or calculated are stored in the speed memory area VA.

Operation

Now, the operation of the present embodiment constructed as mentioned above will be described.

Figure 5:
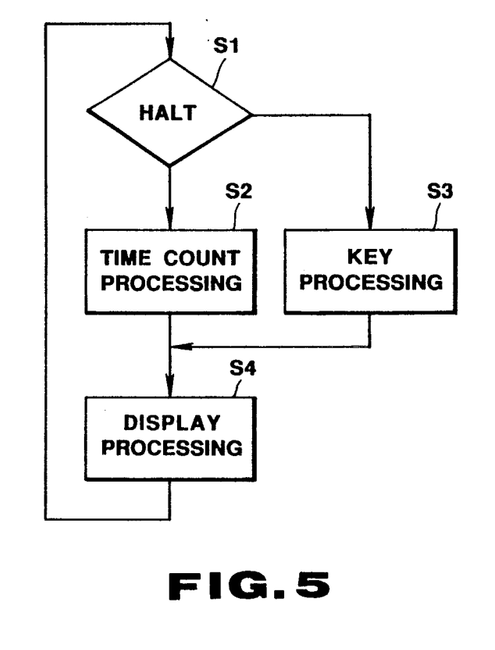
FIG. 5 is a general flow chart showing an outline of operation of an embodiment of the present invention.

FIG. 5 is a general flow chart indicating the outline of the operation of the present embodiment. Normally, the operation stays in a waiting state at Step S1. When the frequency divider circuit 20 of FIG. 3 outputs the time-count signal, time-count processing is executed at Step S2 for advancing by a unit time of the time-count register T which stores the present time. Meanwhile, when a key-input signal or the signal SA from the waveform shaping circuit 25 is output, key processing corresponding thereto is executed at Step S3. At the following Step S4, display processing is executed for causing the liquid crystal display panel 2 to display data in accordance with the mode designated by the registers M, B, C, D and F, after the time count processing or the key processing has been executed. Thereafter, the operation returns to the waiting state at Step S1 again.

Figure 6:
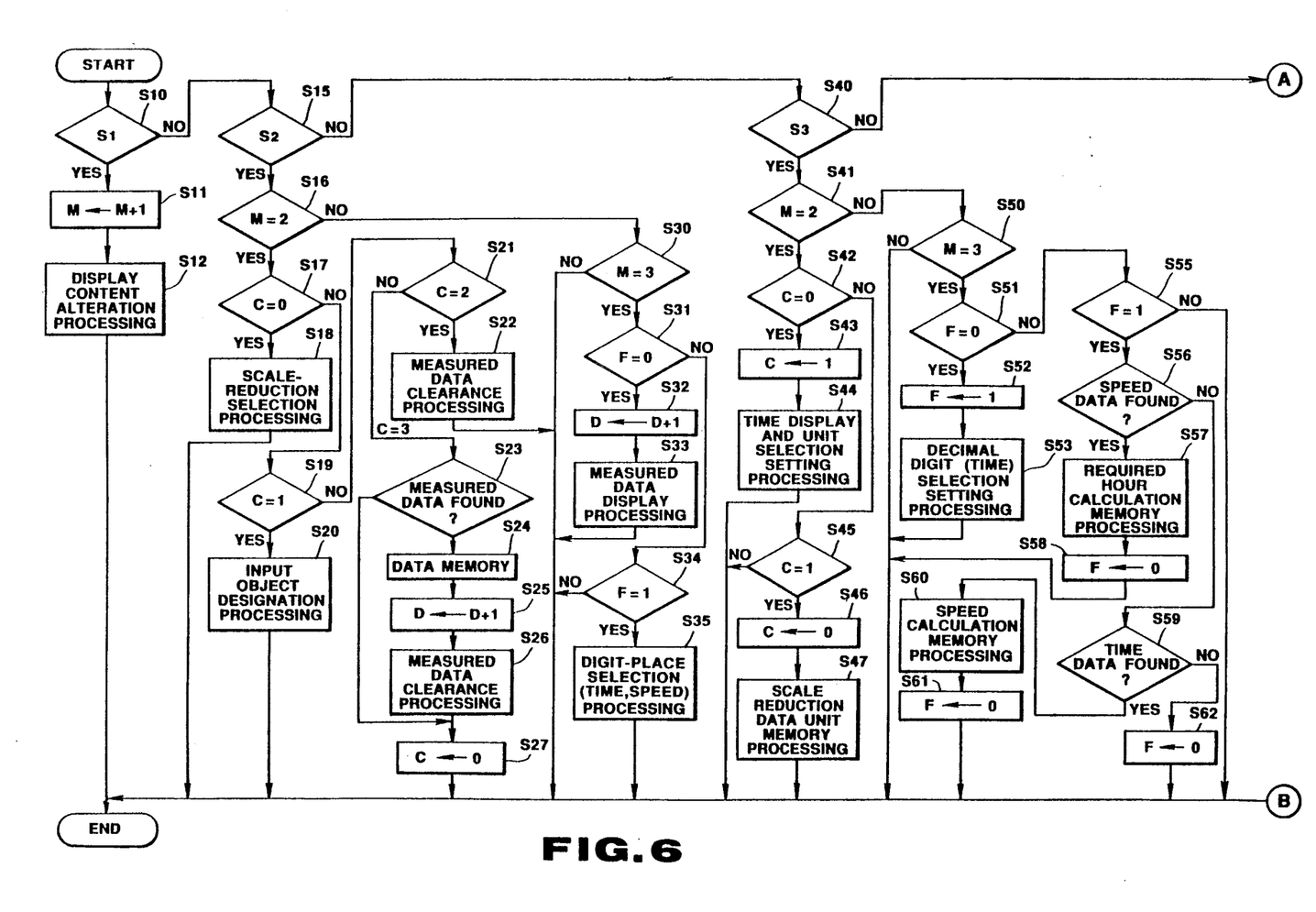
FIGS. 6 and 7 are flow charts showing detail of key processings in the general flow chart shown in FIG. 5.
Figure 7:
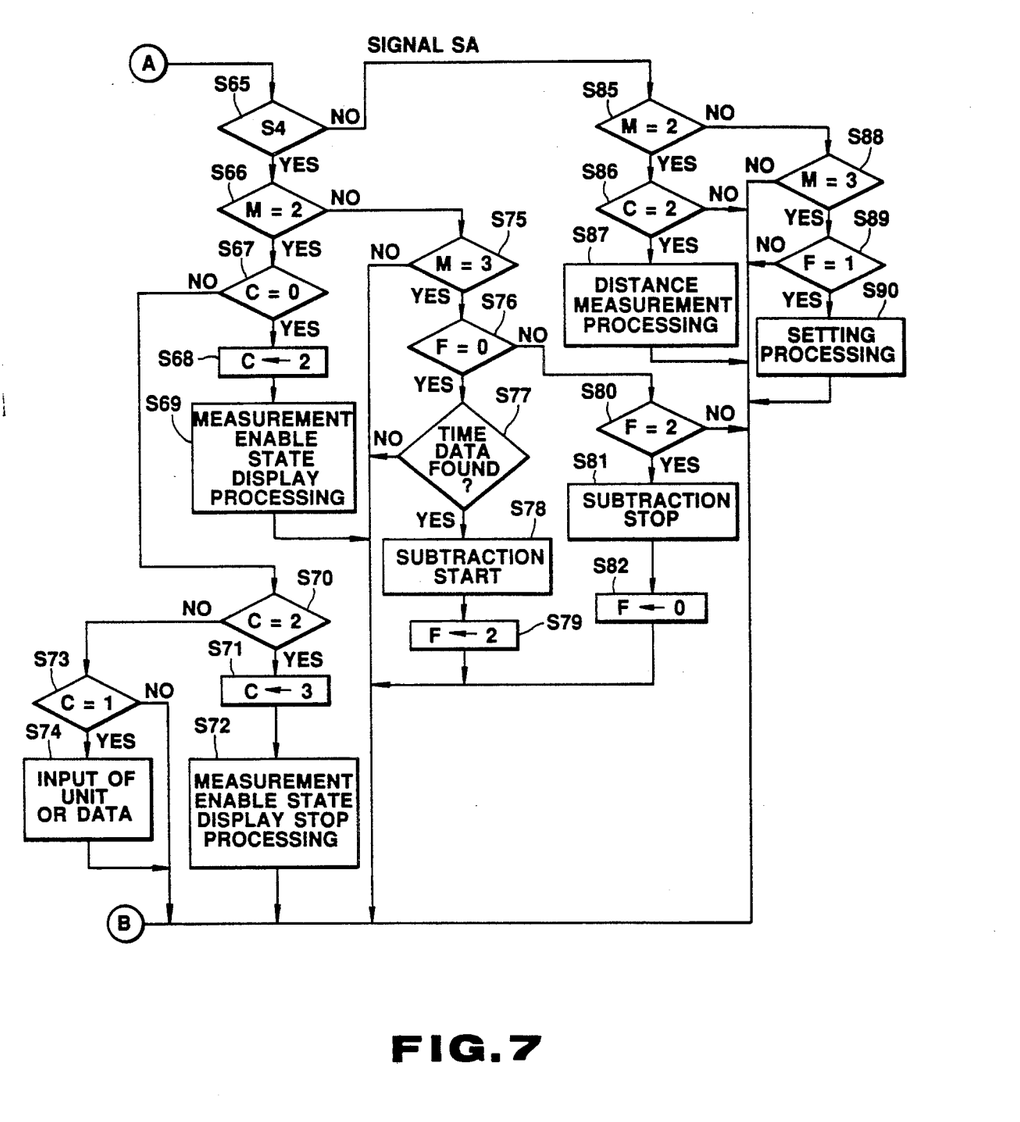

FIGS. 6 and 7 are views showing detailed flow charts of the above key processing at Step S3. The flow charts show the key processings except the processing of the switch $SW_1$ in the map-meter mode (register M="2") and the navigation mode (register M="3"). That is, the key processing in the time-display mode (register M="0") and the measure mode (register M="1") are omitted. FIGS. 8 through 10, 12, 14A and 14B are views showing transitions of indications of the liquid crystal display panel 2 on the basis of various key operation. FIGS. 11, 13A and 13B are views showing memory states of the memory in the navigation-data memory section RM. Hereinafter, the operation of the present embodiment will be described with reference to the above figures.

(a) Operation in the Time-Display Mode and the Measure Mode

Figure 8:
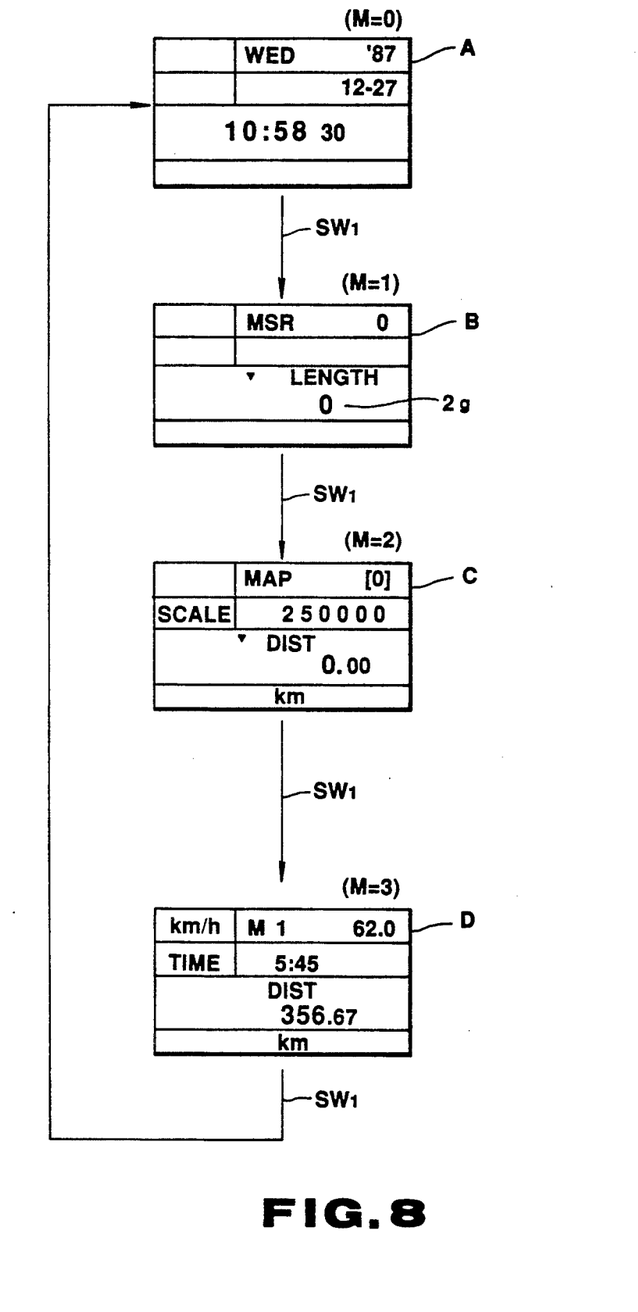
FIG. 8 is a view showing a transition of indications of the liquid crystal display panel, displayed when a mode selection switch SW1 is operated.

For example, in case that the value "0" is set to the mode register M and the time display mode is designated, the present time data of the register T are displayed on the liquid crystal display panel 2, for example, data 10:58 30, December 27, Wednesday, 1987, are displayed, as shown at A in FIG. 8.

When the switch $SW_1$ is operated, the operation advances from the processing at Step S1 to the key processing at Step S3, i.e. to the processing of the flow chart of FIG. 6. At Step S10, the operation of the switch $SW_1$ is detected and increment processing is executed at Step S11 for adding a value "+1" to the mode register M and wherein the mode register M takes a value "1" and the measure mode is set. Then the operation advances to processing at Step S12, where the processing is executed for altering the indication to that in the measure mode, thereby instructing to indicate characters "MSR" on the first display section 1a of the liquid crystal display panel 2 in order to show that the measure mode has been set. The indication state on the display panel 2 at this time is shown at B in FIG. 8.

In the measure mode, measurement of lengths can be executed by moving the measuring wheel 3 so as to roll along a path on the object to be measured. The signal SA is input in accordance with the roll of the measuring wheel 3 and the signal SA is accumulated as length data in the register H. Accordingly, length data obtained in accordance with the rotation of the measuring wheel 3 is stored in the register H and is displayed on the display section 2g of the liquid crystal display panel 2.

(b) Operation in the Map-Meter Mode

The present embodiment in the map-meter mode can be used as a map meter. When the switch $SW_1$ is operated, in the measure mode shown at B in FIG. 8, then the embodiment is brought to the map-meter mode. At this time, the operation of the switch $SW_1$ is detected at Step S10, and the mode register M takes a value "2" at Step S11 and the map meter mode is set. The indication-content altering processing at Step S12 instructs to display scale-reduction data on the liquid crystal display panel 2, which data is stored in any one of memories $E_0$ through $E_9$, e.g., the memory M0, of the scale-reduction data memory section SR in RAM 13, designated by the memory pointer B at the time. At Step S4 of FIG. 5, the scale-reduction data is indicated as shown at C in FIG. 8.

The map-meter mode includes four display states, such as a normal state, a data inputable state, a measurement state and a measurement-result display state. These states are controlled on the basis of the value of the register C.

Figure 9:
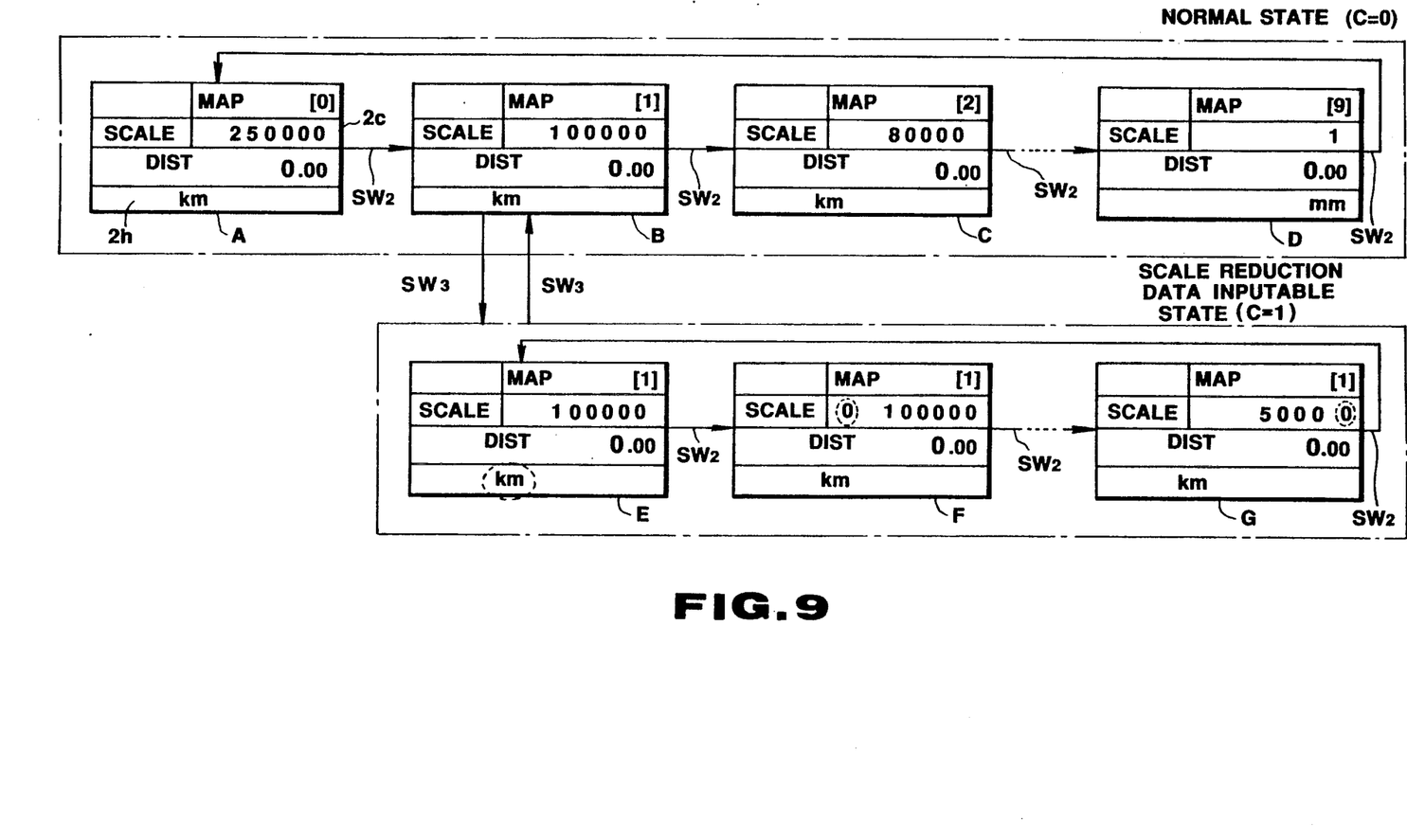
FIG. 9 is a view showing transitions of indications of the liquid crystal display panel in a normal state and a scale-reduction data inputtable state in a map meter mode.

FIG. 9 is a view showing the transitions of indications on the liquid crystal display panel 2 in the normal state and the data inputable state of the above map-meter mode. For example, it is assumed that a value "0" is set to the state register C and therefore the normal state is set, and the memory $E_0$ is designated by the memory pointer B, and the scale reduction, "one 250000th", stored in the memory $E_0$ and the unit of length, "Km" are indicated on the third display section 2c and the sixth display section 2h, respectively, as shown at A in FIG. 9. For selecting scale-reduction data to a map to be used, out of data stored in the other memories, the switch $SW_2$ is repeatedly operated until the required scale-reduction data is displayed on the liquid crystal display panel 2. At this time, the above operation of the switch $SW_2$ is detected at Step S15 of FIG. 6. It is judged at Step S16 that the map meter mode (register M="2") has been set. At Step S17, it is judged that the operation is in the normal state (the register C="0"). At the following Step S18, increment processing is executed for adding a value "+1" to the memory pointer B and thereby scale-reduction selection processings are sequentially executed to designate the following memory. More specifically, when the switch $SW_2$ is operated while the memory $E_0$ is designated, other memory $E_1$ is newly selected and designated. Further, when the switch $SW_2$ is operated again while the memory $E_1$ is designated, then the memory $E_2$ is selected and designated. In this manner, every operation of the switch $SW_2$ selects and designates other memory following the preceding memory. And in the display processing at Step S4 of FIG. 5, data stored in the selected memories are sequentially displayed on the liquid crystal display panel 2, as shown at B through D in FIG. 9. Note that symbols [0], [1], through [9] displayed at the right side of the first display section 2a indicate the memory numbers of memories of the scale-reduction data memory section SR in which the displayed scale-reduction data are stored.

For example, if the scale-reduction data to the map to be used this time is not stored in any memory of the scale-reduction data memory section SR, a scale-reduction data of the memory in which an arbitrary scale-reduction data is stored is revised and the scale-reduction data to the map to be used this time is newly set thereto. In this case, at first, the switch $SW_2$ is operated in the above normal state to designate the memory in which an arbitrary scale-reduction data has been stored. Then, the scale-reduction data is caused to be displayed on the liquid crystal display panel 2. Thereafter, the switch $SW_3$ is operated to set the scale-reduction data inputable state shown at E, F and G in FIG. 9. More specifically, the above operation of the switch $SW_3$ is detected at Step S40 of FIG. 6 and it is judged at Step S41 that the map-meter mode (the register M="2") has been set. At the following Step S42, it is judged that the register C="0", then the operation is in the normal state. Thereafter, the state register C is set at "1" and thereby the operation is brought to the scale-reduction data inputable state at Step S43. The processing at Step S44 instructs to indicate in a blinking fashion the unit as that to be set, which unit is on display at the time.

For example, when the switch $SW_4$ is operated while the contents of the memory 1 shown at B in FIG. 9 are on display, that is, while the scale reduction, one 100000th, the unit data, "km" are on display, the unit data "km" are displayed in a blinking fashion as shown at E in FIG. 9. In this state, when the switch $SW_4$ is operated, the unit data are sequentially selected as will be described in detail later.

Thereafter, other scale-reduction data are input in the following manner. As shown at F and G in FIG. 9, digits of the scale-reduction data are designated in the order of the most significant digit, the second significant digit through the least significant digit by operations of the switch $SW_2$ and the above designated digits are sequentially revised by operations of the switch $SW_4$. The operation will be described for designating data to be input in the above mentioned order by operations of the switch $SW_2$. At Step S15 of FIG. 6, the operation of the switch $SW_2$ is detected, and at the following Step S16, it is judged that the map-meter mode has been set. At Step S17 and S19, it is discriminated that the operation is in the scale-reduction data inputable state, not in the normal state. At Step S20, the display processing is executed for sequentially designating digits of data to be input one by one, and for displaying in a blinking fashion the designated digit every time the digit is designated to be input.

After the digit of data to be input has been designated as mentioned above, the switch $SW_4$ is operated to revise the above designated digit. At this time, the operation of the switch $SW_4$ is detected at Step S65 of FIG. 7 and at the following Step S66, it is judged that the map-meter mode has been set. Further, it is judged at Steps S67, S70 and S73 that the operation is in the scale-reduction data inputable state (the register C="1"). At Step S74, the data to be input are revised, more specifically, for example, for unit data, another or new unit data is selected and revised, and for scale-reduction data, another digits are selected and revised. The revised data are displayed on the liquid crystal display panel 2 at Step S4 of FIG. 5.

After unit data and scale-reduction data to the map to be used for measurement have been input, the switch $SW_3$ is operated again to bring the operation to the normal state, as shown in FIG. 9. At this time, the operation of the switch $SW_3$ is detected at Step S40 and it is judged at Step S41 that the map-meter mode has been set. At Steps S42 and S45, it is judged that the operation is in the scale-reduction data inputable state. Then, a value "0" is set to the state register C at Step S46 and thereby the operation is brought in the normal state. At Step S47, the unit data and the scale-reduction data newly input in the above processing are stored in the memory designated by the memory pointer B (i.e., new unit data and new scale-reduction data are stored in place of the respective old data) and these data are displayed on the liquid crystal display panel 2 at Step S4 of FIG. 5.

Figure 10:
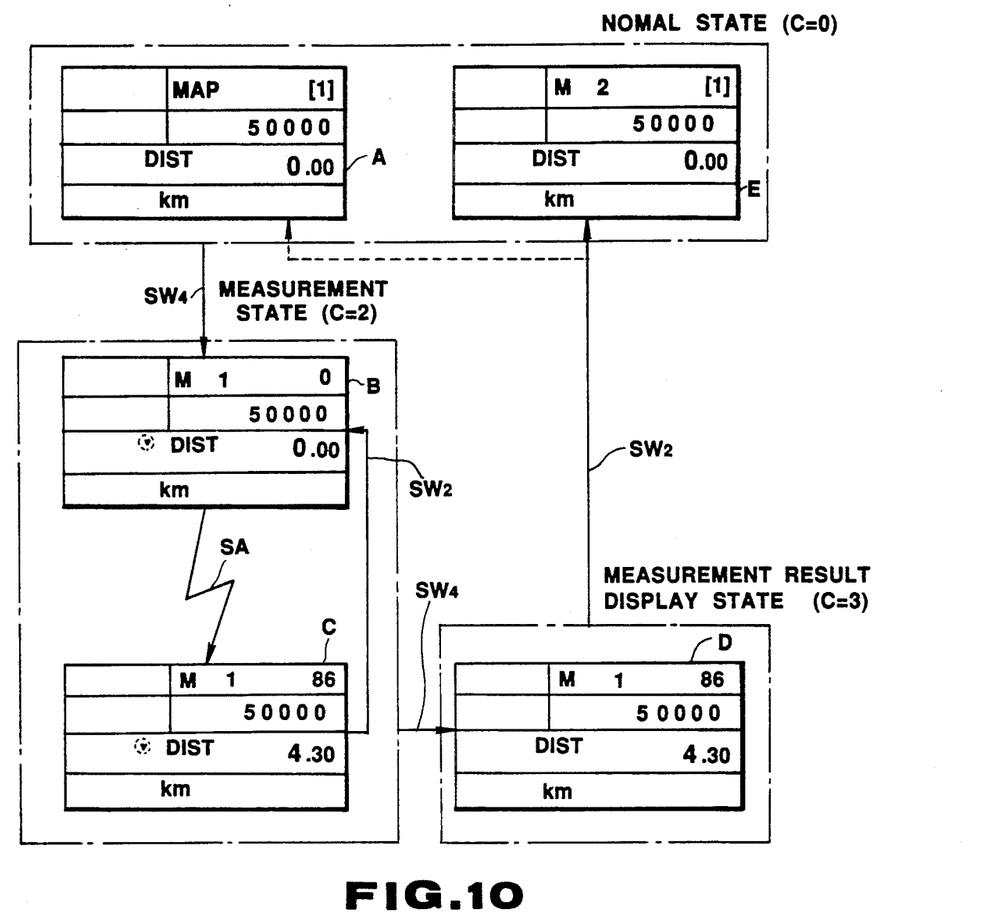
FIG. 10 is a view showing transitions of indications of the liquid crystal display panel in the normal state, a measurement state and a measurement-result display state in the map meter mode.
Figure 11:
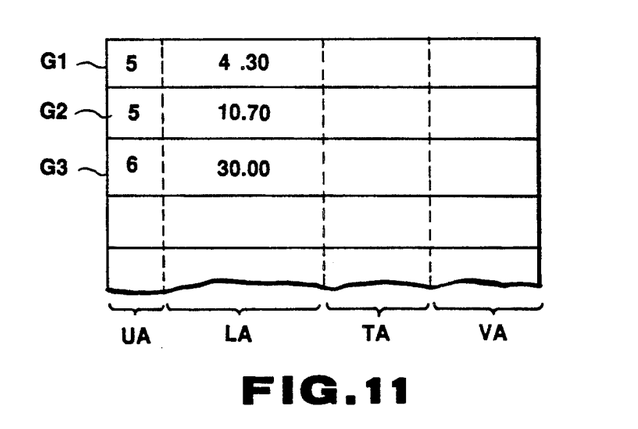
FIG. 11 is a view showing a memory state of a navigation-data storing section RM in RAM.

FIG. 10 is a view showing transitions of indications of the liquid crystal display panel 2 in the normal state, the measurement state and the measurement-result display state of the map-meter mode. In case that, for example, "50000" for the scale reduction and "km" for the unit of measured distance have been set, the data as shown at A in FIG. 10 are displayed on the liquid crystal display panel 2.

Then, the switch $SW_4$ is operated as shown in FIG. 10 and thereby the operation is brought to the measurement state for starting measurement operation. At this time, the operation of the switch $SW_4$ is detected at Step S65 of FIG. 7 and it is judged at Step S66 that the map-meter mode has been set. At step S67, it is judged that the operation is in the normal state. The state register C is set at "2" at Step S68, and thereby the operation is brought in the measurement state. Then, the measurement-enable-state display processings are executed at Step S69, such as the processing for instructing the measurement-state mark display element 2i to effect its blinking display, the processing for causing the first display section 2a to display the memory number of the memory in the navigation-data memory section RM, designated by the memory pointer D and the processing for turning on LED23 of FIG. 3. Thereby, the liquid crystal display panel 2 displays data as shown at B in FIG. 10. Note that a display, "M1" on the first display section 2a in FIG. 10 indicates that the memory $G_1$ has been designated by the memory pointer D.

After the above mentioned preparation has been completed, the length-measuring operation is executed. The measuring wheel 3 is moved to roll along a point-to-point path to be measured on a map. At this time, the waveform shaping circuit 25 of FIG. 3 outputs the signal SA every time the measuring wheel 3 rolls to travel a predetermined length. The operation advances to the processing at Step S87 through those at Steps S85 and S86 of FIG. 7, every time the signal SA is output. The distance measurement processing is executed at Step S87, for adding the content of the register H to length data and storing the result therein, for calculating an actual distance corresponding to the travelling distance of the measuring wheel 3 by using the above predetermined travelling distance data and the scale reduction data, and for sequentially adding the same to the value of the measurement register N. At Step S4 of FIG. 5, the measurement result up to the time, i.e., the travelling distance data of the measuring wheel 3 and the value of the measurement register N are displayed on the fifth display section 2g of the liquid crystal display section 2. For example, in case that the scale reduction to the map is one 50000th and the point to point length on the map is 86 cm, the actual distance is 4.30 km. Therefore when the measurement is completed, data as shown at C in FIG. 10 are displayed on the liquid crystal display panel 2.

When the measurement operation is completed in the manner mentioned above, the switch $SW_2$ is operated to clear the present measurement results for the following measurement operation, otherwise the switch $SW_4$ is operated to terminate the measurement operation and thereby the operation is brought in the display state of the measurement result.

When the switch $SW_2$ is operated to clear the present measurement results for another measurement operation, the operation of the switch $SW_2$ is detected at Step S15. The operation advances to the processing at Step S22 through those at Steps S16, S17, S19 and S21. The processing is executed at Step S22 for clearing the present measurement results stored in the register H and the measurement register N, thereby returning the display on the liquid crystal display panel 2 to that as shown at B in FIG. 10. On the other hand, when the switch $SW_4$ is operated to keep on displaying the present measurement results after completion of the measurement operation, the operation of the switch $SW_4$ is detected at Step S65. Then the operation advances to the processing at Step S71 through those at Steps S66, S67 and S70. At Step S71, a value "3" is set to the state register C and thereby the operation is brought in the above measurement-result display state. Thereafter, at Step S72, the measurement-stop processing is executed for turning off LED 23 to make the measurement operation unable even through the measuring wheel 3 may rotate and the liquid crystal dispaly panel 2 is caused to stop displaying the measurement-state mark display element 2i in a blinking fashion. Thereby, the liquid crystal display panels 2 displays data as shown at D in FIG. 10.

After the operation has been brought in the measurement-result display state in the above mentioned manner, the length of the path which has been measured this time is stored in the memory of the navigation-data memory section RM in RAM 13 (in this case, the above memory is the memory $G_1$ corresponding to the memory number M1 displayed on the first display section 2a), and then to use the same in the navigation mode, the switch $SW_2$ is operated, thereby bringing the operaton in the normal state, again (See FIG. 10). The operation of the switch $SW_2$ at this time is detected at Step S15 and it is judged at Step S16 that the map-meter mode has been set. Further, it is judged at Steps S17, S19 and S22 that the operation is not in the normal state, the scale-reduction data inputable state and the measurement state. Then the operation advances to the processing at Step S23. At Step S23, it is judged that the data measured at this time has been stored in the measurement register N. At Step S24, the above distance data "4.30" and the unit data, "5" for displaying the unit "km" of the distance data are transferred and stored in the distance memory area LA, and the unit memory area UA in the memory (in this case, the memory is the memory $G_1$ corresponding to the memory number M1 which is displayed on the first display section 2a) designated by the memory pointer D. At the following Step S25, the value of the memory pointer D is incremented by "1" for the following measurement operation. The present measured data stored in the measurement register N are cleared at Step S26. A value "0" is set to the state register C and thereby the operation is brought in the normal state again at Step S27. Therefore, the liquid crystal display panel 2 displays the data indicating that the next memory $G_2$ has been designated, as shown at E in FIG. 10. When the measurement operation is not executed in the measurement state and therefore no measured data are stored in the measurement register N, or when data stored in the measurement register N are cleared by operation of the switch S2, the switch $SW_4$ is operated to terminate the measurement operation and thereafter, when the switch $SW_2$ is further operated, the operation advancess to the processing at Step S23 through those at Steps S15, S16, S17, S19 and S21 in the similar manner to that stated above. At Step S23, it is judged that no measured data has been stored in the measurement register N and the operation advances directly to the processing at Step S27. Then the operation returns to the normal state. Accordingly, as shown in a broken line in FIG. 10, the liquid crystal display panel 2 keeps on displaying the data indicating that the memory $G_1$ has been designated as shown at A in FIG. 10.

As described above, after the measurement of the path, the measured distance of which is 4.30 kilometers, has been completed, further measurement operations for two paths are executed. When those lengths have been found to be 10.70 Kilometers and 3.30 Miles, these data are sequentially stored in the navigation-data memory section RM. Therefore, the memory state in the navigation-data memory section RM becomes as shown in FIG. 11.

(c) Operation in the Navigation Mode

It is convenient for making a driving plan to make use of data of distances which have been measured in the above map-meter mode and stored in the memory of the navigation-data memory section RM in RAM 13. In the navigation mode, a car driver can have knowledge at what speed he should drive a car to travel the above distances in predetermined times or in how many times he can travel the distances at a predetermined driving speed, by use of the above data of distances stored in the memory of the navigation-data memory section RM. To set the operation in the navigation mode, the switch $SW_1$ is operated in the above map-meter mode, as shown in FIG. 8.

In this case, the operation of the switch $SW_1$ is detected at Step S10. At Step S11, the value of the mode register M is altered from "2" to "3" and thereby the navigation mode is set. The liquid crystal display panel 2 is instructed to display the data in the navigation mode in place of those in the map-meter mode in Step S12. At Step S4 of FIG. 5, the display panel 2 displays as instructed above.

Figure 12:
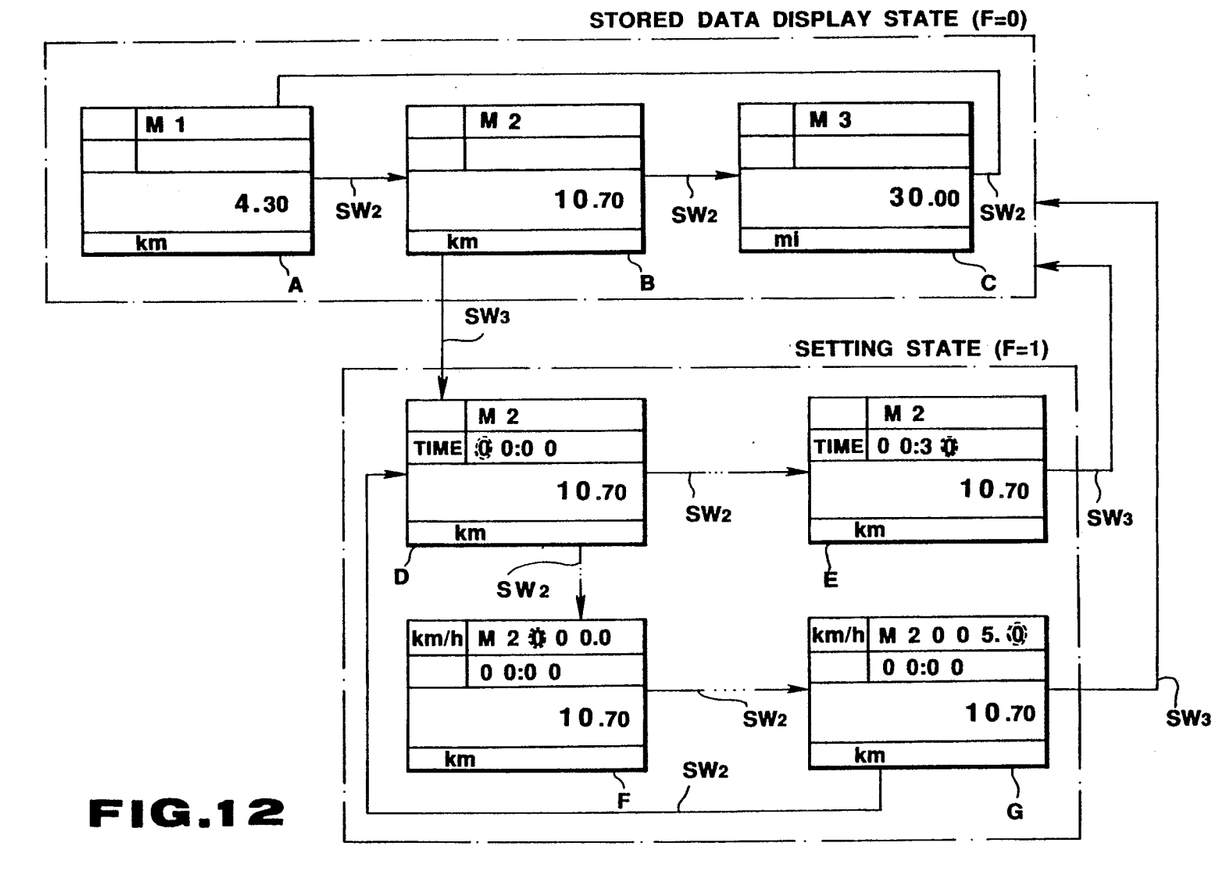
FIG. 12 is a view showing transitions of indications of the liquid crystal display panel in a stored data display state and a setting state in a navigation mode.
Figure 13A:
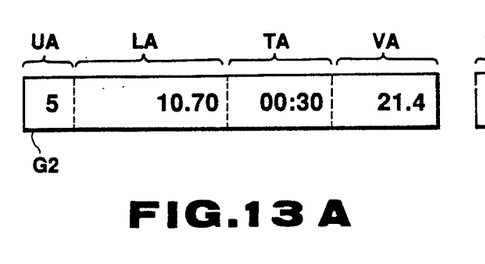
FIGS. 13A and 13B are views showing stored data of a memory G2 of the navigation-data storing section RM.
Figure 13B:
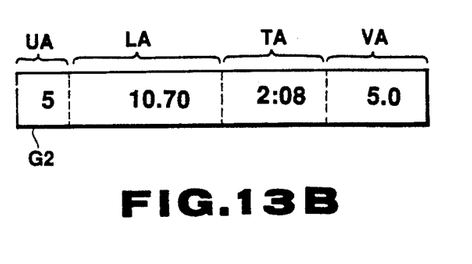

FIG. 12 is a view showing transitions of indications of the liquid crystal display panel 2 in the navigation mode. It is assumed that the state register F has been set at a value "0". In this state, when the switch $SW_2$ is repeatedly operated, distance data and unit data are sequentially displayed together with their memory numbers as shown at A, B and C in FIG. 12, which data have been stored in the relevant memories of the navigation-data memory section RM in RAM 13. More specifically, every operation of the switch $SW_2$ is detected at Step S15, and the operation advances to the processing at Step S32 through those at Steps S16, S30 and S31. At Step S32, the memory pointer D is incremented by "1" and the processing is executed for causing the liquid crystal display panel 2 to display data stored in each memory of the navigation-data memory section RM, the address of which memory is designated by the above memory pointer D.

Then the car driver can select some of data stored in the memory of the navigation-data memory section RM, to use them for making a driving plan and can have knowledge of the driving speed to travel the distance in certain time or the required time to travel the distance at a certain driving speed. In this case, the above certain time and the certain driving speed are to be set. For example, when the memory $G_2$ is selected in which a distance 10.70 km is stored for a driving plan, at first the memory $G_2$ is designated by operation of the switch $SW_2$ and thereby causing the liquid crystal display panel 2 to display the distance data of the driving course and the unit data. Thereafter, the switch $SW_3$ is operated. The operation of the switch $SW_3$ is detected at Step S40. Then the operation advances to the processing at Step S52 through those at Steps S41, S50 and S51. At step S52, the state register F is set at a value "1", thereby bringing the operation in the setting state.

At Step S53, the processing is executed for turning on the "time" display element $2f$ on the fourth display section $2d$, and selecting decimal digit of hour in the time to be displayed on the third display section $2c$ as the above certain time, and for displaying the selected decimal digit in a blinking fashion in order to indicate the above selection. Then, the liquid crystal display panel displays data shown at D in FIG. 12.

After the operaton has been brought in the setting state, time or speed is set. The digit places of time data and speed data are selected by operation of the switch $SW_2$ in order of the most significant place (decimal place of hour) through the least significant place of hour data, the most significant place through the least significant place of speed data and meanwhile, a required digit for the selected digit place is selected and set thereto by rotating operation of the measuring wheel 3. Operation for selecting and designating digit places of data by operating switch $SW_2$ will be described. In this case, every operation of the switch $SW_2$ is detected at Step S15 and the operation advances to the processing at Step S35 through those at Steps S16, S30, S31 and S34. The processing is executed at Step S35 for sequentially designating digit places in the above mentioned order and for indicating the designated place in a blinking display every time the place is designated. Note that while the digit places for the time data are designated, the time display element $2f$ of the fourth display section $2d$ is turned on and when the processing is transferred from designating of digit places for time data to designating of digit places for speed data, the display elements disposed on the second display section $2b$, for indicating the units of speed are turned on in place of the time display element $2f$.

To set a desired digit at the digit place designated in the above mentioned manner, the measuring wheel 3 is rotated until the desired digit appears on the liquid crystal display panel 2. At this time, the operation advances from the processing at Step S65 to the processing at Step S90 through those at Steps S85, S88 and S89 every time the signal SA is input in response to rotation of the measuring wheel 3. The processing is executed at Step S90 for sequentially incrementing the setting value and meanwhile causing the memory to sequentially store the above sequentially incremented setting values in the time memory area TA and the speed memory area VA. Thereby, the setting value is displaced on the liquid crystal display panel 2 at Step S4 of FIG. 5.

When "30 minutes" has been set as a required time in the manner mentioned above, the liquid crystal display panel 2 display data as shown at E in FIG. 12. To set speed without setting time, the switch $SW_2$ is repeatedly operated for four times. These operations of the switch $SW_2$ designate the most significant digit place on the display section $2a$ as shown at F in FIG. 12, and speed data can be set. When 5 kilometer/hour has been set as a speed data, the liquid crystal display panel displays the data as shown at G in FIG. 12.

After a certain hour or a certain speed has been set in the manner mentioned above, to obtain speed data or required hour data from the above certain hour, the certained speed and the distance data, the switch $SW_3$ is operated. Then, the operation is brought in a stored data display state with the register F="0".

Figure 14A:
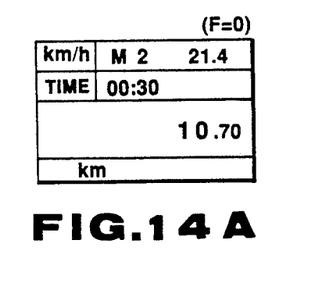
FIGS. 14A and 14B are views showing examples of indications of the liquid crystal display panel displayed after a speed and time have been calculated in a navigation mode.

Operation will be described for obtaining speeds from the required time set as mentioned above and the measured length of the course. For example, "30 minutes" has been set as the required time and the liquid crystal display panel 2 displays as shown at E in FIG. 12. Then, the switch $SW_3$ is operated. The operation of the switch $SW_3$ is detected at Step S40. The operation advances to the processing at Step S56 through those at Steps S41, S50, S51 and S55. It is judged at Step S56 that no speed data has been set in the memory concerning the course, i.e., the speed-memory area VA of the memory $G_2$. Step S59, it is judged that time data has been stored already in the time-memory area TA of the memory $G_2$. Then operation advances to the processing at Step S60. At Step S60, the driving speed 21.4 Kilometers/hour at which a car runs along the course is calculated from the distance data, 10.7 Kilometers which have been stored in the distance memory area LA and the unit memory area UA of the above memory $G_2$ and the hour data, 30 minutes which has been stored in the time-memory area TA. The memory $G_2$ is caused to store the calculated speed in the speed-memory area VA and the liquid crystal display panel 2 is caused to display the calculated speed. After the processsing at Step S60 has been executed as mentioned above, the memory state of the memory $G_2$ will be as shown in FIG. 13. In the meantime, after execution of the processing at Step S60, the state register F is set at a value "0" at Step S61. Then the operation is brought in the stored data display state. Thereby, the liquid crystal display panel 2 display the calculated speed 21.4 Kilometers/hour as shown in FIG. 14A. In the above mentioned way, the driver can easily learn that he should drive a car at the driving speed 21.4 Kilometers/hour to travel the course in 30 minutes.

Now, operation will be described for obtaining a required time from the predetermined speed set as mentioned above and the measured distance. For example, it is assumed that 5.0 Kilometers/hour has been set as the above predetermined speed and the liquid crystal display panel 2 displays the data as shown at G in FIG. 12. When the switch $SW_3$ is operated, the operation of the switch $SW_3$ is detected at Step S40. Then the operation advances to the processing at Step S56 through those at Steps S41, S50, S51 and S55. At Step S56, it is judged that the speed data have been already stored in the memory concerning the course, i.e., the speed-memory area VA of the memory $G_2$ and then the operation advances to the processing at Step S57. The processing is executed at Step S57 for calculating the required hour: 2 hours and 8 minutes which are required when the user of the apparatus walks along the course at the speed 5.0 Kilometer/hour, for storing the required time in the time-memory area TA, and for instructing the liquid crystal display panel 2 to display the required time in addition to the data which have been already displayed. Then, after execution of the processing at Step S57, the memory state of the memory $G_2$ will be as shown in FIG. 13B. Thereafter, the operation advances to the processing at Step S58 and a value "0" is set in the state register F. Then the operation is brought in the stored data display state. The liquid crystal display panel 2 display the calculated required hour: 2 hours and 8 minutes as shown at A in FIG. 14B. As a result, the user of the apparatus can easily learn that the required hour is 2 hours and 8 minutes, when he walks along the course at a speed, 5.0 Kilometers/hour.

Figure 14B:
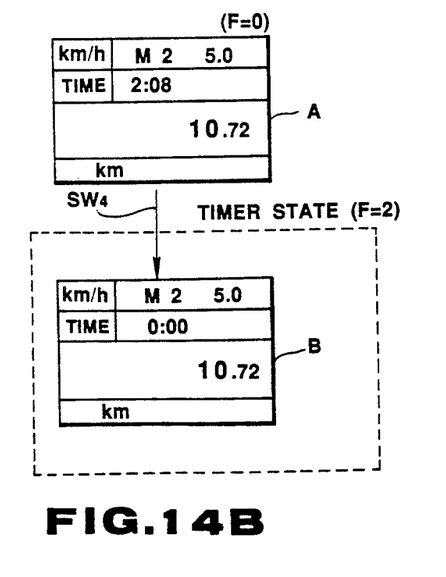

In the above state, i.e., in the state in which the liquid crystal display panel 2 displays the calculated required hour, 2 hours and 8 minutes as shown at A in FIG. 14B, when the switch S4 is operated, the operation of the switch S4 is detected at Step S65. The operation advances to the operation at Step S77 through those at Steps S66, S75 and S76. It is judged at Step S77 that the calculated hour has been stored in the time memory area TA of the above memory $G_2$. The start of the subtraction processing is instructed at Step S78 for subtracting a certain time from the time stored in the above time memory area TA and storing the subtraction result in the memory area TA in place of the data stored previously stored therein. Then, a value "2" is set in the state register F and the operation is brought in a timer state. Thereafter, every time the time count signal is output, the above subtraction processing is executed at Step S2 of FIG. 2 and the subtraction result, i.e., the remainder time is displayed at Step S3. When the remainder time becomes "0" or no time is remain, the data shown at B in FIG. 14B are displayed. Further, when the switch $SW_4$ is operated during the above operation, the operation of the switch $SW_4$ is detected at Step S65. The operation advances to the processing at Steps 81 through those at Steps S66, S75, S76 and S80. At Step S81, the above subtraction processing is stopped and the operation is brought in the stored data display state, again.

When the user of the apparatus measures the length of the particular course on the map and calculates the required time to walk along the course at a predetermined speed and further causes to display the result on the liquid crystal display panel 2 and thereafter operates the switch $SW_4$ and at the same time starts running the particular course at the above predetermined speed, then the user can easily learn during running how many hours after he can run the whole particular course.

The present invention is not limited to the above embodiment and it will be understood that many variations and modifications can be made without departing from the spirit of the present invention. For example, in the above embodiment, a length on a map is measured by means of the measuring wheels 3 with slits formed therein, LED 23 and the photo sensor 24, but the length may be measured by means of a combination of the measuring wheel 3 and other gear train mechanism, one of which gears is provided with slits. Further, means for magnetically detecting the rotation of the measuring wheel 3 may be employed in place of the optical detecting means such as LED and a photo-sensor. Furthermore, mechanical switching means which performs on/off operation in response to the rotation of the measuring wheel may be also used for detecting the number of the rotations of the measuring wheel. A larger or less number of memories may be used at need substituting for the memories $E_0$ through $E_9$ and $G_0$ through $G_9$ provided in the embodiment.

Furthermore, in the present embodiment, the measured data and the calculated data, such as distance data, unit data, hour (or time) data, speed data and the like are displayed on a liquid crystal display device but other type of display devices such as LED and the like may be used as the display device and printing mechanism which prints data may be used instead of the display device. The apparatus may be provided with voice composing means for informing various data in voice.

Although the foregoing description of the present embodiment has been given with reference to the present invention being applied to a wrist watch, the present invention may be assembled in other electronic devices such as a small-sized portable calculator, an electronic note book and a small-sized word processor. The present invention can be also applied to a length-measuring instrument.

The present invention has been described with reference to the embodiment being applied to the map meter as a length measuring apparatus, however the present invention can be used for measuring actual lengths of a product and a structure from a scale-reduced plan, so that the application of the present invention is in no way restricted to the map meter.

What is claimed is:

1. A map meter apparatus, comprising:
 length-signal output means for outputting a signal corresponding to a length of a course to be measured;
 scale-reduction data memory means for storing scale-reduction data;
 unit-data memory means for storing a plurality of unit data of length;
 unit-data selecting means for selecting one of the unit data stored in said unit-data memory means;
 calculation means coupled to said length-signal output means, to said scale-reduction data memory means and to said unit-data selecting means, for obtaining distance data expressed in the unit data selected as a unit of length;
 data memory means having a plurality of distance-data memory areas for storing distance data and a plurality of unit-data memory areas for storing unit data;

addressing means for addressing one of the distance-data memory areas and the unit-data memory areas of said data memory means;

externally operated switching means;

judging means for judging if distance data has been obtained by said calculating means, when said externally operated switching means is operated;

data memory control means for storing the distance data obtained by said calculation means and the unit data selected by said unit-data selecting means in the distance-data memory area addressed by said addressing means and in the unit-data memory area addressed by said addressing means respectively, when said judging means judges that distance-data has been obtained, and for executing renewal of addressing by said addressing means to address the next distance-data memory area, and not executing renewal of addressing by said addressing means to address the distance-data memory area when said judging means judges that no distance-data has been obtained; and display means for successively reading out and displaying the distance data and the unit data stored in the data memory means when said data-memory control means successively executes renewal of addressing by said addressing means to address the next distance-data memory area.

2. A map meter according to claim 1, wherein said length-signal output means comprises:

a rotating member arranged for rolling to travel a course to be measured;

detection means for detecting a number of rotations of said rotating member; and signal counting means for counting signals from said detection means to output a length-signal.

3. A map meter according to claim 2, wherein said detection means comprises:

light emitting means; and light receiving means for receiving light of said light emitting means which light is intermittently intercepted by rotation of said rotating member, and for outputting pulse signals in response to the received light.

4. A map meter according to claim 1, further comprising:

time counting means for counting a number of reference signals to obtain present-time data; and display control means for enabling a display of the present-time data counted by said time counting means on said display means.

5. A map meter according to claim 1, further comprising:

reading and switching means for sequentially reading out a plurality of said distance data stored in said distance data memory means, and for switching said display means to display said read-out distance data.

* * * * *